(12) United States Patent
Brendle et al.

(10) Patent No.: US 12,485,786 B2
(45) Date of Patent: Dec. 2, 2025

(54) HYBRID VEHICLE HAVING AN INTERNAL COMBUSTION ENGINE AND AN ELECTRIC DRIVE

(71) Applicant: Bayerische Motoren Werke Aktiengesellschaft, Munich (DE)

(72) Inventors: Bernhard Brendle, Haldenwang (DE); Heiko Sprenger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 339 days.

(21) Appl. No.: 17/596,393

(22) PCT Filed: Jul. 13, 2020

(86) PCT No.: PCT/EP2020/069685
§ 371 (c)(1),
(2) Date: Dec. 9, 2021

(87) PCT Pub. No.: WO2021/023477
PCT Pub. Date: Feb. 11, 2021

(65) Prior Publication Data
US 2022/0161678 A1 May 26, 2022

(30) Foreign Application Priority Data
Aug. 8, 2019 (DE) ...................... 10 2019 121 415.7

(51) Int. Cl.
*B60L 53/62* (2019.01)
*B60K 15/05* (2006.01)
(Continued)

(52) U.S. Cl.
CPC .............. *B60L 53/62* (2019.02); *B60K 15/05* (2013.01); *B60L 58/13* (2019.02); *B60W 20/20* (2013.01);
(Continued)

(58) Field of Classification Search
CPC ...................................................... B60L 53/62
See application file for complete search history.

(56) References Cited

U.S. PATENT DOCUMENTS

2007/0135257 A1   6/2007   Bissontz
2009/0242291 A1*  10/2009  Sagawa ................... E05B 83/34
                                                180/65.265
(Continued)

FOREIGN PATENT DOCUMENTS

CN    1983090 A    6/2007
CN    102837592 A  12/2012
(Continued)

OTHER PUBLICATIONS

Google Machine Translation of EP3228514A1 (Year: 2016).*
(Continued)

*Primary Examiner* — Jean Paul Cass
(74) *Attorney, Agent, or Firm* — Crowell & Moring LLP

(57) ABSTRACT

A hybrid vehicle has an internal combustion engine drive that includes at least one internal combustion engine and an electromotive drive that includes at least one electric motor and a battery. The battery can be charged both via the internal combustion engine and via an external power supply. At least one electronic control unit is designed such that, in the event of at least one defined condition that indicates an insufficient use of the electromotive drive compared to the internal combustion engine drive, at least one coercive measure is taken to influence the behavior of the driver towards increasing the use of the electrical drive. The coercive measure may be keeping an automatically lockable fuel tank cover locked.

7 Claims, 1 Drawing Sheet

(51) Int. Cl.
  *B60L 58/13* (2019.01)
  *B60W 20/20* (2016.01)
  *B60W 20/40* (2016.01)
(52) U.S. Cl.
  CPC ..... *B60W 20/40* (2013.01); *B60K 2015/0561* (2013.01)

(56) References Cited

U.S. PATENT DOCUMENTS

| | | | |
|---|---|---|---|
| 2012/0041647 A1* | 2/2012 | Vujasinovic | B60L 53/16 |
| | | | 701/49 |
| 2013/0226379 A1 | 8/2013 | Hirai | |
| 2014/0152255 A1* | 6/2014 | Lovett | H02J 7/0029 |
| | | | 320/109 |
| 2014/0244082 A1 | 8/2014 | Caron | |
| 2015/0224997 A1 | 8/2015 | Glugla et al. | |
| 2015/0239365 A1 | 8/2015 | Hyde et al. | |
| 2015/0375612 A1* | 12/2015 | Welschoff | B60K 6/46 |
| | | | 903/910 |
| 2016/0121707 A1 | 5/2016 | Yamamoto et al. | |
| 2016/0297423 A1 | 10/2016 | Blasinski et al. | |
| 2017/0028837 A1* | 2/2017 | Welschoff | B60L 58/12 |
| 2018/0135342 A1* | 5/2018 | Pearce | B60K 15/05 |
| 2019/0186392 A1 | 6/2019 | Dudar et al. | |
| 2021/0104713 A1* | 4/2021 | Takeuchi | H01M 50/531 |

FOREIGN PATENT DOCUMENTS

| | | |
|---|---|---|
| CN | 104002656 A | 8/2014 |
| CN | 105564419 A | 5/2016 |
| CN | 105813876 A | 7/2016 |
| DE | 10 2018 132 481 A1 | 6/2019 |
| EP | 3 225 491 A1 | 10/2017 |
| EP | 3 228 514 A1 | 10/2017 |

OTHER PUBLICATIONS

Google Machine Translation of DE102009011088A1 2009.*
International Search Report (PCT/ISA/210) issued in PCT Application No. PCT/EP2020/069685 dated Oct. 21, 2020 with English translation (six (6) pages).
German-language Written Opinion (PCT/ISA/237) issued in PCT Application No. PCT/EP2020/069685 dated Oct. 21, 2020 (five (5) pages).
German-language Search Report issued in German Application No. 10 2019 121 415.7 dated Jun. 5, 2020 with partial English translation (12 pages).
Chinese-language Office Action issued in Chinese Application No. 202080042141.3 dated Dec. 1, 2023 with English translation (18 pages).

* cited by examiner

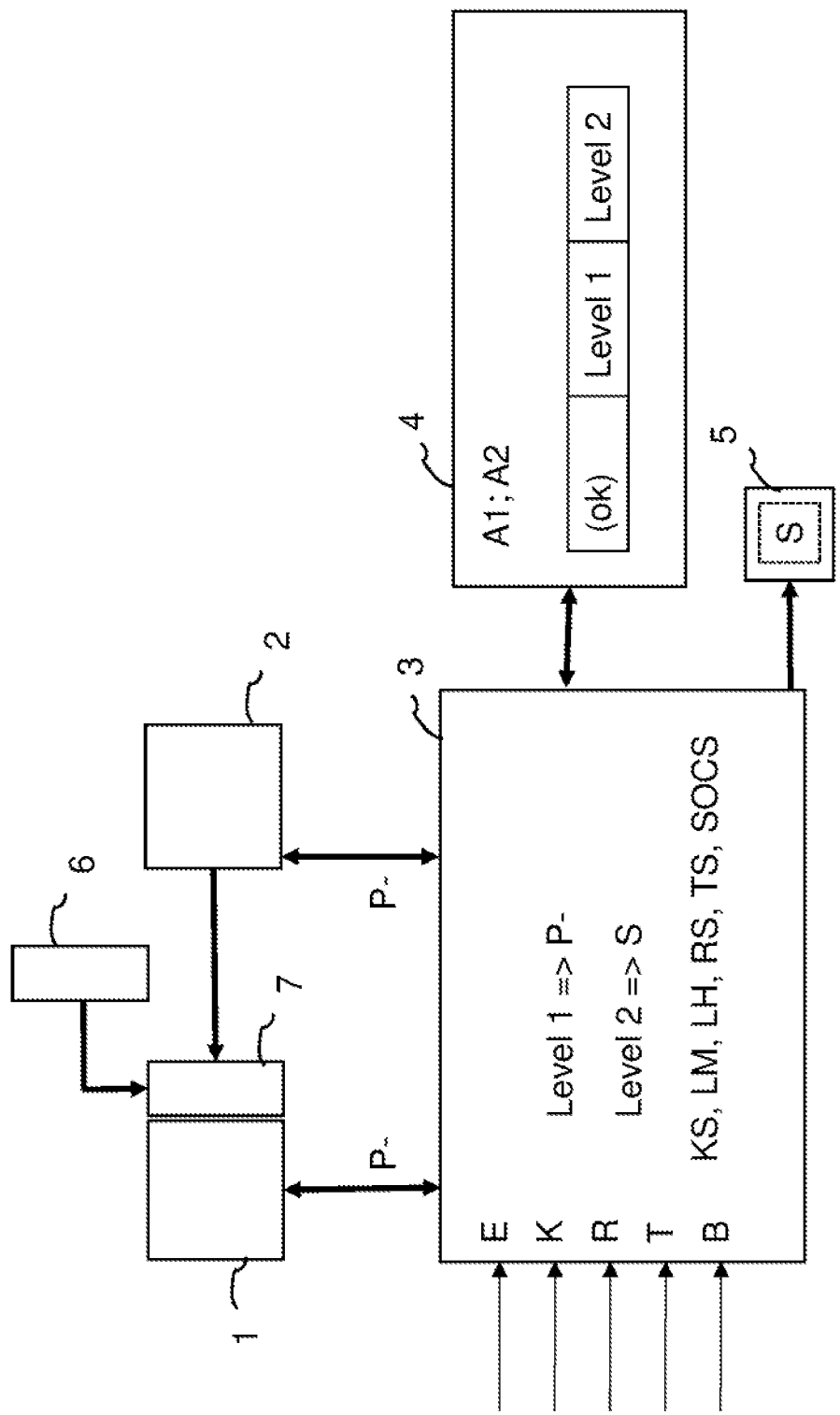

HYBRID VEHICLE HAVING AN INTERNAL COMBUSTION ENGINE AND AN ELECTRIC DRIVE

BACKGROUND AND SUMMARY OF THE INVENTION

A large number of hybrid vehicles having an electric drive and an internal combustion engine drive are already known, in particular so-called PHEVs (Plug-in Hybrid Electric Vehicles). The battery (high-voltage battery) or storage battery of such vehicles can be charged both by means of the internal combustion engine and by means of an external electrical grid. There are also already many known operating strategies by means of which the two drives can be used as optimally as possible in terms of efficiency.

It is an object of the invention to yet further improve a hybrid vehicle with regard to a mode of operation with reduced emissions.

This object is achieved by a hybrid vehicle having an internal combustion engine drive, which comprises at least one internal combustion engine, having an electromotive drive, which comprises at least one electric motor and one storage battery, wherein the storage battery is chargeable both by way of the internal combustion engine and by way of an external electrical grid, having at least one electronic control unit, and having an automatically lockable cover of a fuel tank. The electronic control unit is configured such that, in the presence of at least one defined condition that indicates insufficient use of the electromotive drive in relation to the internal combustion engine drive, at least one coercive measure is implemented to influence the behavior of the driver toward increased use of the electric drive.

The invention is based on the following considerations.

Hybrid vehicles having an electric drive (electric motor and battery or storage battery) and an internal combustion engine drive (internal combustion engine), in particular PHEVs, are intended, with their electric drive, to contribute to lowering fuel consumption and emissions in the passenger motor vehicle sector, at least locally.

This is, however, possible only if such vehicles are also charged sufficiently often, or if such vehicles are charged with a particularly great amount of energy from external electrical grids, preferably with electrical current from renewable energy sources.

There are studies and also current press reports that call the PHEV drive concept into question in this regard, in particular because it is asserted that drivers are externally charging their PHEVs too seldom and are still too often refilling with fuel for the internal combustion engine.

If PHEVs are not charged sufficiently often, they consequently cannot cover sufficiently great distances, or large proportions of distances, electrically and thus without emissions. This behavior thwarts the above-stated aim.

The invention therefore relates to a mechanism that allows the continued operation of a PHEV without restriction only if the vehicle is charged sufficiently during operation, in particular by means of external electrical current.

There are many solutions with regard to the topic of the operating strategy of hybrid vehicles. All known solutions however concentrate on the drives available in a hybrid vehicle optimally interacting or optimally supplementing one another without the driver experiencing any restriction with regard to their driving demand (generally demanded by way of the accelerator pedal). An intentional restriction or limitation of the driver demand is basically known primarily only with regard to safety aspects.

PHEVs nowadays have two complete drive systems (the electric drive and the internal combustion engine drive) jointly on board. The two can be operated entirely independently of one another. The driver ultimately decides, through their behavior, whether the vehicle is operated more electrically, more by internal combustion engine, or in a hybrid fashion. If the storage battery of the electric drive is never or only seldom charged, the PHEV cannot drive electrically, and therefore also cannot achieve the low levels of fuel consumption to contribute to reducing emissions. Various manifestations of measures are possible to positively influence the behavior of the driver.

One manifestation of the invention may be that refilling with fuel is allowed and enabled only (that is to say, as a "coercive measure") if the PHEV has also been charged sufficiently often and with a sufficient energy quantity beforehand. In this manifestation, it is for example possible for the tank cover to be unlocked only if the battery has also been fully charged beforehand. The behavior can be implemented into the operating strategy by way of the use of the vehicle, and specified low levels of consumption can thus be ensured.

Another manifestation with less restriction in the form of a coercive measure for the driver may be that refilling is enabled at all times, or is at least still enabled for a specified limited time (controlled on the basis of time or events), but the driver is no longer provided with the full drive performance of their vehicle, and the performance is degraded if external charging is performed too seldom.

Conceivable manifestations may also be combined and optionally lead to multi-stage coercive measures.

BRIEF DESCRIPTION OF THE DRAWING

FIG. 1 illustrates an exemplary embodiment of the invention.

DETAILED DESCRIPTION OF THE DRAWING

FIG. 1 schematically shows the most important components of the invention in a hybrid vehicle, which is not fully illustrated.

FIG. 1 illustrates an electric motor 1, which is connected to a storage battery 7, and an internal combustion engine 2 of a hybrid vehicle. The storage battery 7 can be electrically charged, in particular during driving operation of the internal combustion engine 2 or at a standstill, for example by way of a fast-charging station 6 of an external electrical grid. The motor 1 and engine 2 are in particular controlled by at least one electronic control unit 3, which is also connected to an automatically lockable cover 5 of a fuel tank, and preferably to a display and operator control unit 4.

The electronic control unit 3 can receive at least one signal, preferably multiple signals, for the purposes of determining the following input parameters:

E: the electrical energy that is charged into the storage battery 7 from an external electrical grid (for example from a fast-charging station 6), wherein the charge quantity and/or the charging frequency may be detectable and can be compared with a specified charge quantity LM and/or a specified charging frequency LH;

K: the fuel consumption (for example per 100 km), which can be compared with a stored fuel consumption threshold KS (for example 2.21/100 km);

R: the ratio or the proportion of purely electric driving in an overall traveling distance, which can be compared with an electric driving proportion threshold RS (for example 75%);

T: the tank content of the fuel tank, which can be compared with a tank content threshold TS; and B: the state of charge (SOC) of the storage battery 7 (for example high-voltage battery) for the electric drive, which can be compared with a state of charge threshold SOCS.

Any conditions based on these or similar input parameters—individually or in combination with one another—that indicate insufficient use of the electromotive drive 1 and 7 in relation to the internal combustion engine drive 2 may be defined. In a manner dependent on these, it is possible for one or more, also multi-stage, coercive measures to be implemented by the control unit 3 to influence the behavior of the driver toward increased use of the electric drive 1 and 7.

For example, it may preferably be provided that, if a specified charge quantity LM and/or a specified charging frequency LH with regard to the charging of the storage battery 7 with energy E from the external electrical grid 6 is undershot, and/or if a defined fuel consumption threshold KS is overshot, and/or if an electric driving proportion threshold RS or an electric driving proportion range is undershot, a first coercive measure stage (Level 1) in the form of a reduction (P−) of the available drive performance P may be implemented. If no recharging of the storage battery 7 with energy E from the external electrical grid 6 is performed in this first coercive measure stage (Level 1), then a second coercive measure stage (Level 2) may be implemented, in the form of keeping the tank cover 5 locked S until the storage battery 7 has been fully recharged. Here, it is preferable for corresponding notifications A1 or A2 to be output on the display and operator control unit 4, which can also allow the driver to make further inputs. Furthermore, the defined conditions and the coercive measures may also be implemented in a manner dependent on the tank content T and/or on the state of charge SOC, for example in a manner dependent on the undershooting of the threshold values TS and SOCS, in such a way that a good compromise between emissions reduction and availability can be achieved.

The implementation of the coercive measures may be manually deactivatable by the driver by means of the display and operator control unit 4 in order to allow voluntary behavior for the purposes of increasing acceptance.

What is claimed is:

1. A hybrid vehicle, comprising:
   an internal combustion engine drive, which comprises at least one internal combustion engine;
   an electromotive drive, which comprises at least one electric motor and one storage battery,
   wherein the storage battery is chargeable both by the internal combustion engine and by an external electrical grid;
   at least one electronic control unit; and
   an automatically lockable cover of a fuel tank,
   wherein the electronic control unit is configured such that, when at least one defined condition that indicates insufficient use of the electromotive drive in relation to the internal combustion engine drive is present, a first coercive measure is implemented in a first coercive measure stage to influence a behavior of the driver toward increased use of the electromotive drive, wherein the first coercive measure is reducing available drive performance of the hybrid vehicle, and
   wherein, a second coercive measure is implemented in response to no recharging of the storage battery with energy from the external electrical grid having been performed in the first coercive measure stage, wherein the second coercive measure is keeping the automatically lockable cover of a fuel tank locked until the storage battery has been fully recharged,
   wherein a notification of the first coercive measure and the second coercive measure is displayed via a display to the driver, and
   wherein implementation of the second coercive measure of locking the automatically lockable cover of the fuel tank is manually deactivated via the display and an operator control unit to allow the driver to manually override the lock of the automatically lockable cover of the fuel tank, wherein the at least one defined condition that indicates insufficient use of the electromotive drive in relation to the internal combustion engine drive remains present after manually overriding the lock of the automatically lockable cover of the fuel tank.

2. The hybrid vehicle according to claim 1, wherein a defined condition is an undershooting of a specified charge quantity and/or of a specified charging frequency with regard to charging of the storage battery with energy from the external electrical grid.

3. The hybrid vehicle according to claim 2, wherein a defined condition is an overshooting of a defined fuel consumption threshold.

4. The hybrid vehicle according to claim 3, wherein a defined condition is an undershooting of an electric driving proportion threshold or of an electric driving proportion range.

5. The hybrid vehicle according to claim 1, wherein the defined conditions and the coercive measures are performed in a manner dependent on tank content and/or on state of charge of the storage battery.

6. The hybrid vehicle according to claim 1, wherein a defined condition is an overshooting of a defined fuel consumption threshold.

7. The hybrid vehicle according to claim 1, wherein a defined condition is an undershooting of an electric driving proportion threshold or of an electric driving proportion range.

* * * * *